United States Patent Office 3,422,101
Patented Jan. 14, 1969

3,422,101
TETRAHYDROTHIENOBENZOTHIAZINES
John R. Carson, Norristown, Pa., assignor to McNeil Laboratories, Incorporated, a corporation of Pennsylvania
No Drawing. Continuation-in-part of application Ser. No. 500,182, Oct. 21, 1965. This application May 5, 1967, Ser. No. 636,271
U.S. Cl. 260—243
Int. Cl. A61k 25/00
17 Claims

ABSTRACT OF THE DISCLOSURE

The compounds are of the class of tetrahydrothienobenzothiazines, useful for their valuable pharmacological properties, such as anticholinergic activity, antihistaminic activity and ability to produce ataxia as a measure of central nervous system depressant activity.

---

This application is a continuation-in-part of my copending application Ser. No. 500,182, filed Oct. 21, 1965, now abandoned.

This invention relates to a new series of organic compounds. More particularly, this invention relates to certain tetrahydrothienobenzothiazines and to methods for their preparation.

The compounds of the present invention may be represented by the following structural formulae:

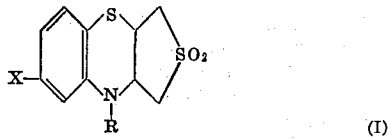

(I)

wherein R is a member selected from the group consisting of H, alkyl,

—$COR_1$, —$CO(CH_2)_2COOH$, —$COCH_2CN$
—$CO(CH_2)_2CONH_2$, —$CO(CH_2)_2CONH$ alk
—$CO(CH_2)_2CON(alk)_2$, —$CO_2$alk

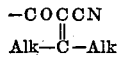

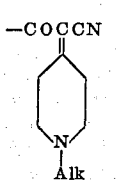

—$(CH_2)_nNH_2$, —$(CH_2)_nNH$ alk, —$(CH_2)_nN(alk)_2$
—$(CH_2)_nNHCOR_1$, —$(CH_2)_2CO_2H$
—$(CH_2)_2CON(alk)_2$, —$(CH_2)_nOH$, and —$SO_2CH_3$ wherein $R_1$ is a member of the group consisting of hydrogen and alkyl containing 1 to 10 carbon atoms; alk is a loweralkyl containing 1 to 6 carbon atoms; and $n$ is an integer selected from the group consisting of 3 and 4; X is a member selected from the group consisting of halo, halomethyl and loweralkoxy; the corresponding 4-sulfoxides and 4-sulfones; and the nontoxic acid addition salts and the therapeutically active loweralkyl quaternary ammonium derivatives of the basic nitrogen containing members; and

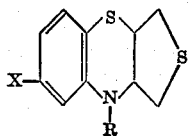

(II)

wherein R is a member selected from the group consisting of alkyl,

—$(CH_2)_nNH_2$, —$(CH_2)_nNH$ alk, —$(CH_2)_nN(alk)_2$ and —$(CH_2)_nOH$; alk is a loweralkyl containing 1 to 6 carbon atoms; X is a member selected from the group consisting of hydrogen, halo, halomethyl and lower alkoxyl; $n$ is an integer selected from the group of 3 and 4; and the nontoxic acid addition salts and the therapeutically active loweralkyl quaternary ammonium derivatives of the basic nitrogen containing members.

As used herein, alk, alkyl and loweralkyl may be straight or branch chained.

The therapeutically active non-toxic acid addition salts of the basic nitrogen containing compounds are prepared by treatment with an appropriate acid such as an inorganic acid, e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicylic, 2-phenoxybenzoic. Conversely, the salt form may be converted in the usual manner into the free base.

The novel nitrogen containing compounds may be converted into the corresponding quaternary ammonium compounds by reaction of the tertiary bases with alkylating agents, i.e., alkyl halides such as methyl iodide, ethyl bromide, propyl chloride; lower alkenyl halides—allyl bromide; esters formed by reacting alkanols with an oxygen-containing acid such as dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, loweralkanols such as ethanol, propanol or butanol; or organic acid amides such as formamide or dimethylformamide. When lower alkyl halogenides are used as quaternizing agents, diethyl ether and benzenes are the preferred solvents.

The compounds of Formulae I and II in tests in animals are found to possess useful pharmacological properties. For example, the blood pressure lowering response to acetyl choline is blocked (anticholinergic) when the compound of Formula I wherein X is hydrogen and R is —$Co(CH_2)_2CONH_2$ or the 4,4-dioxide derived from the compound of Formula I wherein X is hydrogen and R is methyl sulfonyl is administered to an anesthetized dog intraperitoneally in a dose of 50 mg./kg. of body weight. The response is similarly blocked when the compound of Formula I wherein X is hydrogen and R is —$(CH_2)_4NH_2$ is administered intraveneously at a dose of 8 mg./kg. of body weight. The blood pressure lowering response to histamine is blocked (antihistaminic) by the administration of the compound of Formula I wherein X is hydrogen and R is —$CO(CH_2)_2CO_2H$ to an anesthetized dog intraveneously at a dose of 2.4 mg./kg. of body weight. Administration of the compound of Formula II wherein X is hydrogen and R is methyl or the 4-oxide derived from the compound of Formula I wherein X and R are hydrogen to anesthetized dogs intraveneously at doses of 8 to 16 mg./kg. of body weight causes a lowering of blood pressure. The remainder of the compounds tested all cause ataxia when administered intraperitoneally to mice in doses ranging from 10 to 100 mg./kg. of body weight. Ataxia can be used as an indication of central nervous system depression. The corresponding acid addition salts of the basic nitrogen containing compounds have the same utilities as the basic compounds.

The compound 1,3,3a,9a-tetrahydro-9H-thieno[3,4b]-1,4-benzothiazine-2,2-dioxide, (product A) is prepared by heating 3,4-dibromotetrahydrothiophene and o-aminobenzenethiol in a concentrated solution of a weakly basic buffer such as disodium hydrogen phosphate or preferably sodium acetate in a suitable solvent such as water. The 7-chloro derivative of product A is prepared by substituting 4 - chloro - 2-aminobenzenethiol for o-aminobenzenethiol. This derivative is also employed in place of product A in preparing the corresponding 7-chloro derivatives of the derivatives of product A described hereinafter.

The γ-oxo-9-butyric acid derivative of product A is formed by melting together a mixture of product A and succinic anhydride. The reaction is preferably carried out by heating the mixture at a temperature of 125–170° C. in a suitable closed vessel such as a sealed glass tube. The corresponding amides are prepared by converting the acid to a suitable reactive derivative such as the acid halide or the acid anhydride and thereafter reacting with ammonia or a suitable alkyl or dialkyl amine. A preferred method consists of heating the γ-oxo-9-butyric acid compound with excess oxalyl chloride, subsequently removing residual oxalyl chloride by repeated codistillation of the oxalyl chloride with benzene under reduced pressure, and thereafter adding ammonia or a suitable alkyl or dialkyl amine.

The 9-butanol derivative of product A is prepared by reducing the γ-oxo-9-butyric acid compound using diborane in a suitable solvent. The diborane may be prepared by mixing sodium borohydride and boron trifluoride etherate in a solvent such as monoglyme, diglyme, tetrahydrofuran or diethyl ether. Also suitable for use in this reaction is a commercially available solution of diborane in tetrahydrofuran. The same method of reduction is used to reduce the γ-oxo-9-alkanoic amides and the N-alkyl and N,N-dialkyl-γ-oxo-9-alkanoic amides to the corresponding amines. The intermediate boron compounds formed in these reductions are decomposed by the use of an acid such as hydrochloric acid or preferably propionic acid.

The 9-carboxaldehyde derivative is prepared by reacting product A with a formylating agent, preferably formic-acetic anhydride. The 9-methyl derivative is prepared by reducing the 9-carboxaldehyde derivative, using diborane in the manner described above.

The β-oxo-9-propionitrile derivative is prepared by heating product A with cyanoacetic acid and dicyclohexylcarbodiimide in a suitable solvent such as dimethylformamide. The β-oxo-9-(α-alkylidene)propionitrile derivative and the β-oxo-9-[α-(1-methyl-4-piperidylidene)]propionitrile are prepared by reacting the β-oxo-9-propionitrile derivative with the appropriate ketone in the presence of a catalyst such as a secondary amine, for example piperidine or dimethylamine.

The 9-propylamine derivative is prepared by reducing the β-oxo-9-propionitrile derivative using diborane solution in the manner described above.

By reacting the 9-propylamine derivative of product A with formic acetic anhydride, the product formed is N-[3 - (1,3,3a,9a - tetrahydro-9H-thieno[3,4b]-1,4-benzothiazin-9-yl)propyl] formamide, 2,2-dioxide. The corresponding propionamide and valeramide are prepared by replacing formic acetic anhydride with propionic anhydride and valeric anhydride. Other alkanoic anhydrides are employed in a similar manner to produce other alkanoic amides.

The alkyl esters of the 9-carboxylic acid derivatives of product A are prepared by reacting product A with an alkyl chloroformate in a suitable high boiling solvent.

The 9-alkanoyl derivatives of product A are prepared by heating the appropriate reactive alkane carboxylic derivative such as the acid anhydride with product A. The 9-alkanoyl derivatives are converted to the 9-alkyl derivatives by reduction with diborane in the manner described above.

The 9-methylsulfonyl derivative of product A is prepared by heating 3-[(o-methylsulfonamidophenyl)thio]-4-methylsulfonyloxytetrahydrothiophene-1,1-dioxide in a concentrated solution of a weakly basic buffer such as disodium hydrogen phosphate or preferably sodium acetate in a suitable solvent such as water. The starting material for this reaction is prepared by reacting 4-[(o-aminopehnyl)thio] - tetrahydrothiophene - 3-ol - 1,1-dioxide with a methanesulfonyl halide in the presence of an acid acceptor, for example with methane sulfonyl chloride in pyridine.

The 1,3,3a,9a - tetrahydro - 9H-thieno[3,4b]-1,4-benzothiazines corresponding to the 1,3,3a,9a-tetrahydro-9H-thieno[3,4b] - 1,4 - benzothiazine,2,2 - dioxides are prepared by reducing the benzothiazine-2,2-dioxide using lithium aluminum hydride, preferably in the presence of a Lewis acid such as aluminum chloride in a suitable solvent such as tetrahydrofuran.

The 1,3,3a,9a - tetrahydro - 9H-thieno[3,4b]-1,4-benzothiazine,2,2,4 - trioxides and 2,2,4,4 - tetroxides are prepared by oxidation of the corresponding 1,3,3a,9a-tetrahydro - 9H-thieno[3,4b]-1,4benzothiazine-2,2-dioxide. The oxidation can be carried out using a peracid such as perbenzoic acid, monoperphthalic acid, or preferably peracetic acid in a suitable solvent such as acetone or a lower alkanoic acid such as acetic acid. Most conveniently, hydrogen peroxide is added to glacial acetic acid to form peracetic acid. In some instances the 2,2,4-trioxide is formed and in others, the 2,2,4,4-tetroxide is formed.

The following examples are intended to illustrate, but not to limit, the scope of the present invention.

EXAMPLE I

To a solution of 100 grams (0.36 mole) of 3,4-dibromotetrahydrothiophene-1,1-dioxide in 196 grams (1.44 moles) of liquid sodium acetate trihydrate at 80° C. is added 50 grams (0.4 mole) of o-aminobenzenethiol. The reaction mixture is stirred overnight. Water is added to dissolve the sodium acetate. Chloroform is added and the solid product becomes crystalline. The crystals are filtered off and recrystallized from acetone. The product is 1,3,3a,9a - tetrahydro - 9H - thieno[3,4b] - 1,4 - benzothiazine-2,2-dioxide; M.P. 181–183.5° C.

EXAMPLE II

A thoroughly blended mixture of 15 grams of 1,3,3a,9a-tetrahydro-9H-thieno[3,4b]-1,4-benzothiazine-2,2 - dioxide and 30 grams of succinic anhydride is prepared by grinding the components using a mortor and pestle. The mixture is heated at 150° C. in a sealed tube overnight. The resulting solid is extracted with 30 percent ammonia and filtered. The filtrate is acidified with 3 N hydrochloric acid and extracted with chloroform. The chloroform is evaporated and the solid material is recrystallized from ethyl acetate. The product is 1,3,3a,9a-tetrahydro-γ-oxo-9H-thieno[3,4b]-1,4-benzothiazine-9-butyric acid,2,2 - dioxide; M.P. 173–173.5° C.

EXAMPLE III

To a suspension of 5 grams (0.015 mole) of 1,3,3a,9a-tetrahydro - γ - oxo-9H-thieno[3,4b]-1,4-benzothiazine-9-butyric acid-2,2-dioxide in 100 ml. of benzene is added 4.77 grams (0.038 mole) of oxalyl chloride. The reaction mixture is heated at 35–45° C. for 3 hours until gas evolution ceases. The reaction mixture is then concentrated under reduced pressure. Benzene is added and the solution is again concentrated. Benzene is again added and the solution is poured with stirring into 170 ml. of cold, concentrated ammonium hydroxide. The oily solid formed is filtered off and is recrystallized twice from ethanol. The product is 1,3,3a,9a-tetrahydro-γ-oxo - 9H - thieno[3,4b]-1,4-benzothiazine - 9 - butyramide,2,2-dioxide; M.P. 181–182° C.

EXAMPLE IV

To a solution of 32.6 grams (0.096 mole) of 1,3,3a,9a-tetrahydro-γ-oxo-9H-thieno[3,4b] - 1,4 - benzothiazine-4-butyric acid,2,2-dioxide in 326 ml. of benzene is added 30.2 grams (0.24 mole) of oxalyl chloride. The solution is heated at 50–55° C. for 5 hours. The reaction mixture is then evaporated to an oil. The oil is redissolved in benzene and the solution is again evaporated to an oil. A solution of the oil in monoglyme is added with cooling to a liter of a 25 percent aqueous solution of dimethylamine. The solid which separates is extracted with chloroform and the extract is evaporated to remove excess dimethylamine. The residue is washed with sodium bicarbonate solution, dried with magnesium sulfate and evaporated to an oil. Benzene is added and the resulting solid is recrystallized from anhydrous ethanol and then from acetone. The product is 1,3,3a,9a-tetrahydro-N,N-dimethyl-γ-oxo-9H-thieno[3,4b]-1,4 - benzothiazine - 9 - butyramide,2,2-dioxide; M.P. 167–168° C.

EXAMPLE V

To a suspension of 10 grams (0.03 mole) of 1,3,3a,9a-tetrahydro - γ - oxo-9H-thieno[3,4b]-1,4-benzothiazine-9-butyric acid,2,2-dioxide in 100 ml. of monoglyme is added 2.12 grams (0.056 mole) of sodium borohydride. The reaction is stirred until evolution of hydrogen ceases. The reaction mixture is then cooled to 0° C. and 10.4 grams (0.072 mole) of boron trifluoride etherate is added over a period of ½ hour. The reaction is stirred overnight at room temperature. Water and chloroform are added. The chloroform layer is washed with dilute aqueous sodium bicarbonate solution and then with water. The extract is dried with magnesium sulfate and concentrated to yield a solid product, which is recrystallized from dimethylformamide. The product is 1,3,3a,9a - tetrahydro - 9H-thieno[3,4b] - 1,4 - benzothiazine-9-butanol,2,2-dioxide; M.P. 166.0–168.5° C.

EXAMPLE VI

To a suspension of 21 grams (0.062 mole) of 1,3,3a,9a-tetrahydro - γ - oxo-9H-thieno[3,4b]-1,4-benzothiazine-9-butyramide,2,2-dioxide in 500 ml. of dry tetrahydrofuran is added dropwise, over a one hour period with stirring, 248 ml. of a ½ M solution of diborane in tetrahydrofuran (obtained from Metal Hydrides, Inc.). The reaction mixture is then stirred and heated under reflux for 2 hours. After cooling, 100 ml. of 6 N hydrochloric acid is added slowly. The tetrahydrofuran is removed and the solution is rendered basic with 25 percent sodium hydroxide solution. The solution is extracted with chloroform. The extract is dried with magnesium sulfate and concentrated. The solid product recovered is recrystallized several times from ethyl acetate. The product is 1,3,3a,9a-tetrahydro-9H-thienol[3,4b]-1,4-benzothiazine - 9 - butylamine,2,2-dioxide; M.P. 113–115° C.; maleate salt, M.P. 184–184.5° C.

EXAMPLE VII

A suspension of 10.3 grams (.028 mole) of 1,3,3a,9a-tetrahydro - N,N - dimethyl - γ - oxo - 9H-thieno[3,4b]-1,4-benzothiazine-9-butyramide,2,2-dioxide in tetrahydrofuran is treated over a one hour period with 139 ml. of ½ M diborane in tetrahydrofuran. The reaction mixture is stirred one hour at room temperature and is then refluxed for 2 hours. Upon cooling, 69.5 ml. of 6 N hydrochloric acid is added, the mixture is evaporated to dryness and the solid material is suspended in water. The suspension is extracted with chloroform. The extract is dried with magnesium sulfate and the chloroform is removed. The solid material is refluxed in 150 ml. of diglyme in the presence of 6.3 grams (0.085 mole) of propionic acid for 2 hours. The reaction mixture is evaporated to an oil and ethanol is added. The resulting crystallized product is recrystallized from an anhydrous ethanol-petroleum ether mixture. The product is 1,3,3a,9a-tetrahydro-N,N-dimethyl-9H-thieno[3,4b]-1,4 - benzothiazine - 9 - butylamine, 2,2-dioxide; M.P. 98–99° C.

EXAMPLE VIII

A 20 gram (0.083 mole) quantity of 1,3,3a,9a-tetrahydro-9H-thieno[3,4b]-1,4-benzothiazine - 2,2 - dioxide is added to 39.8 grams (0.45 mole) of formic-acetic anhydride. The reaction mixture is stirred and heated under reflux for 18 hours. The reaction mixture is poured over cracked ice and the resulting crystals are recrystallized from dimethylformamide. The product is 1,3,3a,9a-tetrahydro[3,4b] - 9H - 1,4 - benzothiazine - 9 - carboxaldehyde,2,2-dioxide; M.P. 218.5–220.5° C.

EXAMPLE IX

To a suspension of 7.6 grams (0.028 mole) of 1,3,3a,9a - tetrahydro - thieno[3,4b]-9H-1,4-benzothiazine-9-carboxaldehyde,2,2-dioxide in 100 ml. of dry tetrahydrofuran is added 47.2 ml. of a ½ M solution of diborane in tetrahydrofuran dropwise over a one hour period. The reaction mixture is stirred and heated under reflux for 2 hours and is then cooled in an ice bath and acidified with 40 ml. of 6 N hydrochloric acid. After removal of the tetrahydrofuran, the resultant fluffy solid is washed with water and recrystallized from ethyl acetate. The product is 9 - methyl - 1,3,3a,9a - tetrahydro - 9H-thieno[3,4b]-1,4-benzothiazine-2,2-dioxide; M.P. 148–149.5° C.

EXAMPLE X

To a suspension of 5.1 grams (0.0188 mole) of 1,3,3a,9a - tetrahydro - 9 - methyl - 9H-thieno[3,4b]-1,4-benzothiazine-2,2,4-trioxide in 100 ml. of pyridine is added 2.44 grams (0.0207 mole) of thionyl chloride. The reaction mixture is then heated on a steam bath for one hour, stirred at room temperature for one hour and poured into ice water. The solid material formed is recrystallized from acetone. The product is 3a-chloro-1,3,3a,9a-tetrahydro-9-methyl - 9H - thieno[3,4b]-1,4-benzothiazine-2,2-dioxide; M.P. 187–189° C.

EXAMPLE XI

A mixture of 10.85 grams (0.0426 mole) of 1,3,3a,9a-tetrahydro - 9-methyl-9H-thieno[3,4b]-1,4-benzothiazine-2,2-dioxide and 4.85 grams (0.128 mole) of lithium aluminum hydride is treated cautiously (may explode) with 260 ml. of anhydrous ether with continuous stirring. To the resulting suspension is added a solution of 17.1 grams (0.128 mole) of aluminum chloride in 150 ml. of ether. The reaction mixture is refluxed for 3 hours. Thereafter 25 ml. of water is added and the mixture is filtered. The inorganics are washed with ether and chloroform. The filtrates are combined and washed with 25 percent aqueous sodium hydroxide solution and then with water. The organic solution is dried with magnesium sulfate and evaporated to an oil. The oil is distilled at 169–175° C. (0.5–1 mm.). The product is 1,3,3a,9a - tetrahydro - 9-methyl-9H-thieno[3,4b]-1,4-benzothiazine.

EXAMPLE XII

To a solution of 15.2 grams (0.063 mole) of 1,3,3a,9a-tetrahydro - 9H - thieno[3,4b] - 1,4 - benzothiazine-2,2-dioxide in 40 ml. of dimethylformamide heated to 60° C. is added 5.36 grams (0.063 mole) of cyanoacetic acid and 13.4 grams (0.065 mole) of dicyclohexylcarbodiimide. The resulting suspension is stirred overnight at 60° C. Sufficient acetic acid is then added to decompose the excess carbodiimide. The suspension is filtered and the filtrate is poured into a large quantity of ice and water. The precipitate which forms is crystallized from acetone. The product is 1,3,3a,9a - tetrahydro - β-oxo-9H-thieno[3,4b]-1,4-benzothiazine-9-propionitrile; M.P. 179–183° C.

EXAMPLE XIII

A solution of 5 grams (0.0162 mole) of 1,3,3a,9a-tetrahydro - β - oxo - 9H - thieno[3,4b]-1,4-benzothiazine-9- propionitrile-2,2-dioxide in acetone containing 3 ml. of piperidine as catalyst is refluxed for 2½ hours. The solvent is evaporated to yield an oil which crystallizes upon the addition of anhydrous ethanol. The crystals are recrystallized from anhydrous ethanol. The product is 1,3,3a,9a - tetrahydro - α - isopropylidene-β-oxo-9H-thieno [3,4b]-1,4-benzothiazine-9-propionitrile-2,2-dioxide; M.P. 178–179° C.

EXAMPLE XIV

To a suspension of 10 grams (0.0322 mole) of 1,3,3a, 9a - tetrahydro - β - oxo - 9H-thieno[3,4b]-1,4-benzothiazine-9-propionitrile-2,2-dioxide in 300 ml. of anhydrous ethanol is added 3.28 grams (0.029 mole) of N-methylpiperidone and 3 ml. of piperidine. The reaction mixture is refluxed for 5½ hours and is then allowed to stand at room temperature overnight. The suspension is filtered and the precipitate is recrystallized twice from 95 percent ethanol. The product is 1,3,3a,9a-tetrahydro-α-(1-methyl - 4 - piperidylidene) - β-oxo-9H-thieno[3,4b]-1,4-benzothiazine - 9 - propionitrile - 2,2 - dioxide; M.P. 197–198.5° C.

EXAMPLE XV

To a suspension of 27.3 grams (0.089 mole) of 1,3,3a, 9a - tetrahydro - β - oxo-9H-thieno[3,4b]-1,4-benzothiazine-9-propionitrile in 500 ml. of dry tetrahydrofuran is added 440 ml. of a ½ M diborane solution in tetrahydrofuran over a one hour period. The reaction mixture is thereafter stirred for one hour at room temperature and then refluxed for two hours. After cooling in an ice bath, 200 ml. of 6 N hydrochloric acid is added and the mixture is stirred for 10–15 minutes. After the tetrahydrofuran is removed under reduced pressure the solution is rendered basic with 25 percent aqueous sodium hydroxide solution. The suspension is extracted several times with chloroform and the extract is dried with magnesium sulfate and concentrated. The resulting oily solid is dissolved in methanol and treated with an excess of maleic acid. The resulting salt is recrystallized from methanol. The product is 1,3,3a, 9a - tetrahydro - 9H - thieno[3,4b] - 1,4-benzothiazine-9-propylamine-2,2-dioxide maleate; M.P. 174–175.5° C.

EXAMPLE XVI

A solution of 1 gram (0.00336 mole) of 1,3,3a,9a-tetrahydro - 9H - thieno[3,4b] - 1,4 - benzothiazine-9-propylamine-2,2-dioxide in 0.0162 mole of formic acid anhydride is refluxed for 5 hours, cooled and poured into ice water. The mixture is extracted with chloroform. The extract is dried with magnesium sulfate and evaporated to an oil. The oil is triturated with ether and the resulting solid is recrystallized from 95 percent ethanol. The product is N-[3-(1,3,3a,9a - tetrahydro - 9H - thieno[3,4b] - 1,4 - benzothiazine - 9 - yl)propyl]formamide-2,2-dioxide; M.P. 124–126° C.

EXAMPLE XVII

To a solution of 8.3 grams (0.0344 mole) of 1,3,3a,9a-tetrahydro-9H-thieno[3,4b] - 1,4 - benzothiazine,2,2 - dioxide in 43 ml. of tetramethylene sulfone is added 7.46 grams (0.0688 mole) of ethyl chloroformate. The reaction mixture is heated for 3½ hours at 120° C. and is then poured into ice water. The resulting solid material is dissolved in ether. The solution is dried with magnesium sulfate and evaporated to an oil. The oil is triturated with ether and the resulting solid is recrystallized twice from benzene-methylcyclohexane. The product is ethyl 1,3,3a,9a - tetrahydro-9H-thieno[3,4b]-1,4-benzothiazine-9-carboxylate,2,2-dioxide; M.P. 100–102° C.

EXAMPLE XVIII

To 30 grams (0.0415 mole) of propiolactone is added 10 grams (0.0415 mole) of 1,3,3a,9a - tetrahydro - 9H-thieno[3,4b]-1,4-benzothiazine,2,2-dioxide. The reaction mixture is heated between 50–70° C. for 2 hours and then between 70–80° C. for 16 hours. Upon cooling, the solidified reaction mixture is dissolved in chloroform. The solution is extracted with sodium bicarbonate solution. The resulting solution is acidified with concentrated hydrochloric acid. A chloroform extract of this solution is dried with magnesium sulfate and evaporated to an oil which solidifies on standing. The solid is recrystallized twice from benzene. The product is 1,3,3a,9a-tetrahydro-9H-thieno[3,4b]-1,4-benzothiazine - 9 - propionic acid,2,2-dioxide; M.P. 165–166° C.

EXAMPLE XIX

A stirred heated syrup of 107 grams (0.786 mole) of sodium acetate trihydrate is treated with 25 grams (0.127 mole) of 2-amino-4-chlorobenzenethiol hydrochloride and then portionwise with 32.1 grams (0.0131 mole of 3,4-dibromotetrahydrothiophene. The reaction mixture is heated on a steam bath for 18 hours and is then poured into ice water. A solution of the resulting solid in ether is washed free of sodium acetate with water. The ethereal solution is dried with magnesium sulfate and evaporated to an oil. Trituration with anhydrous ethanol yields crystals which are recrystallized from anhydrous ethanol. The product is 7 - chloro - 1,3,3a,9a - tetrahydro - 9H-thieno[3,4b]-1,4-benzothiazine,2,2-dioxide; M.P. 190.5–191.5° C.

EXAMPLE XX

In a flask which has been swept with nitrogen, 52.5 grams (0.042 mole) of o-aminobenzenethiol is heated to 90° C. While the liquid is being stirred rapidly, 37.2 grams (0.28 mole) of epoxysulfolane is added over a period of one hour. The mixture is heated and stirred for 18 hours. The product is crystallized from benzene and is recrystallized from ethyl acetate and thereafter from ethyl acetate-hexane. The product is 4-[(o-aminophenyl)thio]-tetrahydrothiophene-3-ol-1,1-dioxide; M.P. 103–105° C.

EXAMPLE XXI

To a solution of 129.5 grams (0.50 mole) of 4-[(o-aminophenyl)thio] - tetrahydrothiophene-3-ol-1,1-dioxide in 2 liters of dry pyridine cooled to 5° C. is added 114.6 grams (1.0 mole) of methanesulfonyl chloride over a 30 minute period. The reaction mixture is stirred overnight at 0° C. and is then poured into 4 liters of ice water and crystallized by scratching. The solid is washed with acetone and recrystallized from acetone. The product is 3-[(o-methylsulfonamidophenyl)thio] - 4 - methylsulfonyloxytetrahydrothiophene-2,2-dioxide; M.P. 168–169° C.

EXAMPLE XXII

To 330 grams of sodium acetate trihydrate heated to 90° C. is added 33.8 grams (0.0815 mole) of 3-[(o-methylsulfonamidophenyl)thio] - 4 - methylsulfonyloxytetrahydrothiophene-2,2-dioxide over a period of one hour with vigorous stirring. Heating is continued for 3 hours. Thereafter the reaction mixture is diluted with 500 ml. of water and the mixture is rendered basic with aqueous sodium hydroxide solution. The solid is washed with methanol and recrystallized from chloroform. The product is 9-methylsulfonyl - 1,3,3a,9a - tetrahydro-9H-thieno[3,4b]-1,4-benzothiazine,2,2-dioxide; M.P. 184–186° C.

EXAMPLE XXIII

To a suspension of 1 gram (0.0031 mole) of 9-methylsulfonyl - 1,3,3a,9a - tetrahydro-thieno[3,4b] - 1,4-benzothiazine, 2,2-dioxide in 50 ml. of glacial acetic acid is added 3.96 ml. (0.034 mole) of 30 percent hydrogen peroxide. The mixture is stirred overnight at room temperature and is then poured on ice. The solid product obtained is 9 - methylsulfonyl - 1,3,4a,9a-tetrahydro-thieno[3,4b]-9H-1,4-benzothiazine-2,2,4,4-tetroxide; M.P. 265–266° C.

EXAMPLE XXIV

A suspension of 15 grams (0.062 mole) of 1,3,3a,9a-tetrahydro - 9H-thieno[3,4b]-1,4-benzothiazine,2,2-dioxide in 70.5 ml. of 30 percent hydrogen peroxide and 150 ml.

of glacial acetic acid is stirred overnight and is then poured on ice. The solid which separates is recrystallized from dimethylformamide. The product is 1,1,3,3a,9a-tetrahydro-9H - thieno[3,4b]-1,4-benzothiazine,2,2,4-trioxide; M.P. 306–308° C.

EXAMPLE XXV

To a suspension of 10.7 grams (0.042 mole) of 1,3,3a,9a - tetrahydro - 9 - methyl-9H-thieno[3,4b]-1,4-benzothiazine,2,2-dioxide in 107 ml. of glacial acetic acid is added 14.5 ml. (0.126 mole) of 30 percent hydrogen peroxide. The reaction mixture is stirred overnight and is then poured into ice water. The solid which separates is crystallized from acetone. The product is 1,3,3a,9a-tetrahydro-9 - methyl - 9H-thieno[3,4b]-1,4-benzothiazine,2,2,4-trioxide; M.P. 214–215° C.

EXAMPLE XXVI

Using the procedure of Example V and replacing 1,3,3a,9a-tetrahydro-γ-oxo - 9H - thieno[3,4b]-1,4-benzothiazine-9-butyric acid with an equivalent amount of the product of Example XVIII, the product obtained is 1,3,3a,9a-tetrahydro - 9H - thieno[3,4b]-1,4-benzothiazine-9-propanol,2,2-dioxide.

EXAMPLE XXVII

Using the procedure of Example IV and replacing dimethylamine with equivalent amounts of diethylamine, dipropylamine, dibutylamine and dihexylamine, the products obtained are 1,3,3a,9a-tetrahydro-N,N-A-γ-oxo-9H-thieno[3,4b]-1,4-benzothiazine-9 - butyramide,2,2 - dioxides wherein A is diethyl, dipropyl, dibutyl and dihexyl respectively.

EXAMPLE XXVIII

Using the procedure of Example VII and replacing 1,3,3a,9a - tetrahydro - N,N-dimethyl-γ-oxo-9H-thieno[3,4b]-1,4-benzothiazine-9-butyramide with the corresponding N,N-diethyl, -dipropyl, -dibutyl and -dihexyl compounds, the products obtained are 1,3,3a,9a-tetrahydro-N,N-A-9H-thieno[3,4b] - 1,4 - benzothiazine-9-butylamine,2,2-dioxides wherein A is diethyl, dipropyl, dibutyl and dihexyl respectively.

EXAMPLE XXIX

A mixture of 30 grams of 1,3,3a,9a-tetrahydro-9H-thieno[3,4b]-1,4-benzothiazine,2,2-dioxide and 60 grams of propionic anhydride is heated in a sealed tube for 16 hours at 150° C. After cooling and breaking the tube, the reaction product is recovered by pouring into ice water, neutralizing with 13.5 percent ammonium hydroxide and filtration. The solid product is recrystallized twice from dimethylformamide and water. The product is 9-propionyl-1,3,3a,9a - tetrahydro-9H-thieno[3,4b]-1,4-benzothiazine,2,2-dioxide; M.P. 279–281° C.

EXAMPLE XXX

A mixture of 1 gram of 1,3,3a,9a,-tetrahydro-9H-thieno[3,4b]-1,4-benzothiazine,2,2-dioxide and 3 ml. of 2-ethyl-3-methylvaleric anhydride is stirred at 120° C. for 17 hours. After cooling and addition of ethanol and charcoal, the resulting solution is filtered. Ice water is added and the resulting oily suspension is extracted with ether. The ether extract is washed with potassium bicarbonate solution and is then dried with magnesium sulfate and evaporated to an oil. The oil is treated with hot methylcyclohexane, the solution is cooled and the solid material is recrystallized from methylcyclohexane. The product is 9-[2-ethyl-3-methylvaleryl] - 1,3,3a,9a-tetrahydro - 9H-thieno[3,4b] - 1,4-benzothiazine,2,2-dioxide; M.P. 114–115° C.

EXAMPLE XXXI

Using the procedure of Example XXX and replacing 2-ethyl-3-methylvaleric anhydride with equivalent amounts of butyric anhydride, heptanoic anhydride and undecanoic anhydride, the products obtained are the 9-butyryl, 9-heptoyl and 9-undecanoyl derivatives of 1,3,3a9a-tetrahydro-9H-thieno[3,4b]-1,4-benzothiazine,2,2-dioxide.

EXAMPLE XXXII

Using the procedure of Example XI and replacing 1,3,3a,9a-tetrahydro-9-methyl-9H - thieno[3,4b]-1,4 - benzothiazine,2,2-dioxide with equivalent amounts of the products of Examples V to VII, XV, XXVI and XXVIII, the corresponding 1,3,3a,9a-tetrahydro-9-A-9H-thieno[3,4b]-1,4-benzothiazines are obtained, wherein A is

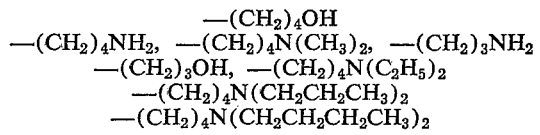

or —$(CH_2)_4N(CH_2CH_2CH_2CH_2CH_2CH_3)_2$.

EXAMPLE XXXIII

Using the procedure of Example IX and replacing 1,3,3a,9a-tetrahydro-9H-thieno[3,4b]-1,4 - benzothiazine - 9-carboxaldehyde,2,2-dioxide with equivalent amounts of the products of Examples XXIX, XXX and XXXI, the corresponding 9-alk derivatives are obtained wherein alk is propyl, 2-ethyl-3-methyl-pentyl, butyl, heptyl or undecyl.

EXAMPLE XXXIV

Using the procedure of Example XVI and as starting material an equivalent amount of the product of Example VI, the product obtained is N-[3-(1,3,3a,9a-tetrahydro-9H-thieno[3,4b]-1,4-benzothiazin - 9 - yl)butyl]formamide,2,2-dioxide.

Using the procedure of Example XVI, and as starting materials the products of Example VI and Example XV respectively, and replacing the formic acetic anhydride with equivalent amounts of propionic anhydride and valeric anhydride respectively, the products obtained are N-[3-(1,3,3a,9a-tetrahydro-9H-thieno[3,4b]-1,4 - benzothiazin-9-yl)propyl]-A,2,2-dioxides and N-[3-(1,3,3a,9a-tetrahydro-9H-thieno[3,4b]-1,4-benzothiazin - 9 - yl)butyl]-A,2,2-dioxides, wherein A is propionamide and valeramide respectively.

EXAMPLE XXXV

Using the procedure of Example VII and as starting materials equivalent amounts of the products of Examples XVI and XXXIV, the products obtained are 1,3,3a,9a-tetrahydro-N-alk-9H - thieno[3,4b]-1,4 - benzothiazine-9-propylamine, 2,2 - dioxides and 1,3,3a,9a - tetrahydro-N-alk-9H-thione[3,4b]-1, 4-benzothiazine-9-butylamine, 2,2-dioxides, wherein alk is methyl, propyl or pentyl.

EXAMPLE XXXVI

To a solution of 1.33 grams (0.0425 mole) of 1,3,3a,9a-tetrahydro-9H - thieno[3,4b]-1,4 - benzothiazine-9-propionic acid, 2,2-dioxide in 40 ml. of benzene is added 21.4 grams (0.17 mole) of oxalyl chloride and the mixture is heated at 50–55° C. for 5 hours. The benzene is evaporated in vacuo and the residue is reacted with 100 ml. of 25 percent aqueous dimethylamine solution. The solid material is dissolved in chloroform and the solution is washed in sequence with dilute hydrochloric acid, sodium bicarbonate and saturated brine. The solution is then dried over magnesium sulfate and evaporated in vacuo. The product is 1,3,3a,9a - tetrahydro - N,N - dimethyl-9H-thieno[3,4b]-1,4 - benzothiazine-9-propionamide, 2,2-dioxide.

Using the foregoing procedure and replacing dimethylamine with equivalent amounts of dipropylamine and dihexylamine, the products obtained are the N,N-dipropyl and the N,N-dihexyl derivatives of the foregoing propionamide.

EXAMPLE XXXVII

To a suspension of 0.95 gram (0.0028 mole) of 1,3,3a,9a-tetrahydro - N,N - dimethyl - 9H-thieno[3,4b]-1,4-benzothiazine-9-propionamide,2,2-dioxide in 20 ml. of tetrahydrofuran is added 14 ml. of a ½ M solution of diborane in tetrahydrofuran over a period of one hour. The reaction mixture is stirred at room temperature for one hour and thereafter is heated under reflux for 2 hours. To the reaction mixture is added in sequence 30 ml. of diglyme and 1.02 grams of propionic acid. The solvent is distilled until the boiling point of diglyme is attained. The mixture is then refluxed for one hour and then allowed to stand for 16 hours at room temperature. The solvent is distilled in vacuo and the residue is partioned between chloroform and dilute sodium hydroxide. The chloroform extract is dried with magnesium sulfate and concentrated in vacuo. The product is 1,3,3a,9a-tetrahydro - N,N - dimethyl-9H-thieno[3,4b]-1,4-benzothiazine-9-propylamine,2,2-dioxide.

Using the foregoing procedure and replacing 1,3,3a,9a-tetrahydro - N,N - dimethyl-9H-thieno[3,4b]-1,4-benzothiazine-9-propionamide,2,2-dioxide with the other products of Example XXXVI, the products obtained are the N,N-dipropyl and the N,n-dihexyl derivatives of the foregoing propylamine.

EXAMPLE XXXVIII

Using the procedure of Example XVII and replacing ethyl chloroformate with an equivalent amount of methyl chloroformate, propyl chloroformate, butyl chloroformate and hexyl chloroformate, the products obtained are the methyl, propyl, butyl and hexyl 1,3,3a,9a-tetrahydro-9H-thieno[3,4b]-1,4-benzothiazine-9-carboxylate,2,2-dioxides.

EXAMPLE XXXIX

Using the procedure of Example II and replacing 1,3,3a,9a-tetrahydro-9H-thieno[3,4b]-1,4 - benzothiazine,2,2-dioxide with an equivalent amount of 7-chloro-1,3,3a,9a-tetrahydro-9H-thieno[3,4b]-1,4-benzothiazine,2,2-dioxide, the product obtained is 7-chloro-1,3,3a,9a-tetrahydro-γ-oxo-9H-thieno[3,4b]-1,4-benzothiazine-9-butyric acid,2,2-dioxide. Replacing an equivalent amount of this product for 1,3,3a,9a - tetrahydro - γ - oxo-9H-thieno[3,4b]-1,4-benzothiazine-9-butanoic acid,2,2-dioxide in the processes of Examples III and IV affords 7-chloro-1,3,3a,9a-tetrahydro-γ-oxo-9H - thieno[3,4b]-1,4-benzothiazine-9-butyramide,2,2-dioxide and 7-chloro-1,3,3a,9a-tetrahydro-N,N-dimethyl-γ-oxo - 9H - thieno[3,4b]-1,4-benzothiazine-9-butyramide,2,2-dioxide. Replacing equivalent amounts of these products for 1,3,3a,9a-tetrahydro-N,N-dimethyl-γ-oxo-9H - thieno[3,4b]-1,4-benzothiazine - 9-butyramide, 2,2-dioxide in Example VII, the products obtained are 7 - chloro - 1,3,3a,9a - tetrahydro - 9H-thieno[3,4b]-1,4-benzothiazine-9-butylamine,2,2-dioxide and 7-chloro-1,3,3a,9a - tetrahydro - N,N-dimethyl-9H-thieno[3,4b]-1,4-benzothiazine-9-butylamine,2,2-dioxide.

EXAMPLE XL

Using the procedure of Example XIII and replacing acetone with equivalent amounts of dipropyl ketone and methyl isobutyl ketone, the products obtained are 1,3,3a,9a - tetrahydro-α-(dipropylmethylene) - β-oxo-9H-thieno[3,4b]-1,4-benzothiazine-9-propionitrile,2,2-dioxide and 1,3,3a,9a-tetrahydro-α - (4-methyl-2-pentylidene)-β-oxo-9H-thieno[3,4b]-1,4-benzothiazine-9-propionitrile,2,2-dioxide.

EXAMPLE XLI

Using the procedure of Example XVIII and replacing 1,3,3a,9a-tetrahydro-9H-thieno[3,4b]-1,4 - benzothiazine, 2,2-dioxide with an equivalent amount of the product of Example XIX, the product obtained is 7-chloro-1,3,3a,9a-tetrahydro-9H-thieno[3,4b]-1,4-benzothiazine-9-propionic acid,2,2-dioxide.

EXAMPLE XLII

Using the procedure of Example XXXVI and replacing 1,3,3a,9a - tetrahydro-9H-thieno[3,4b]-1,4-benzothiazine-9-propionic acid,2,2-dioxide with an equivalent amount of the product of Example XLI, the product obtained is 7-chloro-1,3,3a,9a-tetrahydro-N,N - dimethyl - 9H - thieno[3,4b]-1,4-benzothiazine-9-propionamide,2,2-dioxide.

EXAMPLE XLIII

Using the procedure of Example XXXVII and replacing 1,3,3a,9a-tetrahydro - N,N-dimethyl - 9H - thieno[3,4b]-1,4-benzothiazine-9-propionamide with an equivalent amount of the product of Example XLII, the product obtained is 7-chloro-1,3,3a,9a-tetrahydro-N,N-dimethyl-9H - thieno[3,4b]-1,4-benzothiazine-9 - propylamine,2,2-dioxide.

What is claimed is:

1. A member selected from the group consisting of a compound of the formula:

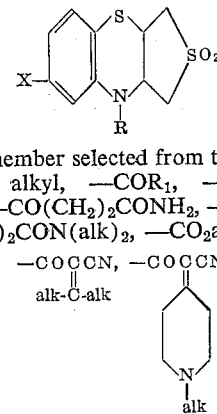

wherein R is a member selected from the group consisting of H, lower alkyl, —$COR_1$, —$CO(CH_2)_2COOH$, —$COCH_2CN$, —$CO(CH_2)_2CONH_2$, —$CO(CH_2)_2CONH$ alk, —$CO(CH_2)_2CON(alk)_2$, —$CO_2alk$, —COCCN, —COCCN
alk-C-alk —$(CH_2)_nNH_2$, —$(CH_2)_nNH$ alk, —$(CH_2)_nN(alk)_2$, —$(CH_2)_nNHCOR_1$, —$(CH_2)_2CO_2H$, —$(CH_2)_2CON(alk)_2$, —$(CH_2)_nOH$, and —$SO_2CH_3$ wherein $R_1$ is a member of the group consisting of hydrogen and alkyl containing 1 to 10 carbon atoms; alk is a loweralkyl containing 1 to 6 carbon atoms; and $n$ is an integer selected from the group consisting of 3 and 4; X is a member selected from the group consisting of hydrogen and chlorine; the corresponding 4-sulfoxides and 4-sulfones; and the nontoxic acid addition salts of the basic nitrogen containing members.

2. A member selected from the group consisting of a compound of the formula:

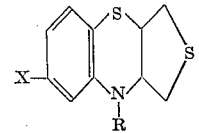

wherein R is a member selected from the group consisting of lower alkyl, —$(CH_2)_nNH_2$, —$(CH_2)_nNH$ alk, —$(CH_2)_nN(alk)_2$ and —$(CH_2)_nOH$; alk is a loweralkyl containing 1 to 6 carbon atoms; X is a member selected from the group consisting of hydrogen and chlorine; $n$ is an integer selected from the group consisting of 3 and 4; and the nontoxic acid addition salts of the basic nitrogen containing members.

3. 1,3,3a,9a-tetrahydro - 9H - thieno[3,4b]-1,4-benzothiazine-2,2-dioxide.

4. 9 - methyl-1,3,3a,9a-tetrahydro-9H-thieno[3,4b]-1,4-benzothiazine.

5. 9 - methyl-1,3,3a,9a-tetrahydro-9H-thieno[3,4b]-1,4-benzothiazine-2,2,4-trioxide.

6. 3a - chloro-1,3,3a,9a-tetrahydro-9-methyl-9H-thieno[3,4b]-1,4-benzothiazine-2,2-dioxide.

7. 7 - chloro-1,3,3a,9a-tetrahydro-9H-thieno[3,4b]-1,4-benzothiazine-2,2-dioxide.

8. 4 - [(o-aminophenyl)thio] - tetrahydrothiophene-3-ol-1,1-dioxide.

9. 3 - [(o-methylsulfonamidophenyl)thio]-4-methylsulfonyl-oxytetrahydrothiophene-1,1-dioxide.

10. 1,3,3a,9a-tetrahydro - β - oxo-9H-thieno[3,4b]-1,4-benzothiazine-9-propionitrile.

11. 1,3,3a,9a-tetrahydro - γ - oxo-9H-thieno[3,4b]-1,4-benzothiazine-9-butyric acid-2,2-dioxide.

12. 1,3,3a,9a - tetrahydro - N,N - dimethyl-9H-thieno[3,4b]-1,4-benzothiazine-9-butylamine-2,2-dioxide.

13. 1,3,3a,9a-tetrahydro - α - isopropylidene-β-oxo-9H-thieno[3,4b] - 1,4-benzothiazine-9-propionitrile-2,2-dioxide.

14. 1,3,3a,9a-tetrahydro - 9H - thieno[3,4b]-1,4-benzothiazine-9-pyropylamine-2,2-dioxide.

15. Ethyl 1,3,3a,9a-tetrahydro - 9H - thieno[3,4b]-1,4-benzothiazine-9-carboxylate-2,2-dioxide.

16. 1,3,3a,9a-tetrahydro - 9H - thieno[3,4b]-1,4-benzothiazine-9-butanol-2,2-dioxide.

17. 1,3,3a,9a-tetrahydro - γ - oxo-9H-thieno[3,4b]-1,4-benzothiazine-9-butyramide-2,2-dioxide.

References Cited
UNITED STATES PATENTS

| | | | |
|---|---|---|---|
| 2,393,925 | 1/1946 | Morris et al. | 260—332.1 |
| 3,004,970 | 10/1961 | Skinner et al. | 260—243 |
| 3,117,124 | 1/1964 | Krapcho et al. | 260—243 |
| 3,166,554 | 1/1965 | Krapcho et al. | 260—243 |

HENRY R. JILES, *Primary Examiner.*

J. M. FORD, *Assistant Examiner.*

U.S. Cl. X.R.

260—332.1, 999

UNITED STATES PATENT OFFICE
CERTIFICATE OF CORRECTION

Patent No. 3,422,101                                            January 14, 1969

John R. Carson

It is certified that error appears in the above identified patent and that said Letters Patent are hereby corrected as shown below:

Column 4, line 8, "aminopehnyl" should read -- aminophenyl --. Column 8, line 15, "mole" should read -- mole) --; line 69, "1,3,4a,9a" should read -- 1,3,3a,9a --. Column 9, line 3, "1,1,3,3a,9a" should read -- 1,3,3a,9a --. Column 10, line 57, "1.33" should read -- 13.3 --.

Signed and sealed this 24th day of March 1970.

(SEAL)

Attest:

Edward M. Fletcher, Jr.                                          WILLIAM E. SCHUYLER, JR.

Attesting Officer                                                          Commissioner of Patents